(12) United States Patent
Hahn et al.

(10) Patent No.: US 9,129,624 B1
(45) Date of Patent: Sep. 8, 2015

(54) DSA SUSPENSION WITH MICROACTUATORS EXTENDING TO GIMBAL THROUGH FLEXIBLE CONNECTORS

(71) Applicant: Magnecomp Corporation, Murrieta, CA (US)

(72) Inventors: Peter Hahn, Bangkok (TH); Kuen Chee Ee, Chino, CA (US); Long Zhang, Murrieta, CA (US)

(73) Assignee: MAGNECOMP CORPORATION, Murrieta, CA (US)

( * ) Notice: Subject to any disclaimer, the term of this patent is extended or adjusted under 35 U.S.C. 154(b) by 0 days.

(21) Appl. No.: 14/491,932

(22) Filed: Sep. 19, 2014

Related U.S. Application Data (63) Continuation of application No. 13/684,016, filed on Nov. 21, 2012, now Pat. No. 8,879,210.

(51) Int. Cl.
*G11B 5/48* (2006.01)
*G11B 5/53* (2006.01)

(52) U.S. Cl.
CPC .............. *G11B 5/4833* (2013.01); *G11B 5/53* (2013.01)

(58) Field of Classification Search
CPC .... G11B 5/4873; G11B 5/482; G11B 5/4833; G11B 5/53
USPC ........................................... 360/245.3, 234.6
See application file for complete search history.

(56) References Cited

U.S. PATENT DOCUMENTS

| | | | |
|---|---|---|---|
| 6,069,771 A | 5/2000 | Boutaghou et al. |
| 6,078,473 A | 6/2000 | Crane et al. |
| 6,222,706 B1 | 4/2001 | Stefansky et al. |
| 6,297,936 B1 | 10/2001 | Kant et al. |
| 6,327,120 B1 | 12/2001 | Koganezawa et al. |
| 6,359,758 B1 | 3/2002 | Boutaghou |
| 6,376,964 B1 | 4/2002 | Young et al. |
| 6,512,659 B1 | 1/2003 | Hawwa et al. |
| 6,549,375 B1 | 4/2003 | Crane et al. |
| 6,597,539 B1 | 7/2003 | Stupp et al. |
| 6,618,220 B2 | 9/2003 | Inagaki et al. |
| 6,621,661 B1 | 9/2003 | Ichikawa et al. |
| 6,738,231 B2 | 5/2004 | Arya et al. |
| 6,760,196 B1 | 7/2004 | Niu et al. |
| 6,785,096 B2 | 8/2004 | Kuwajima et al. |
| 6,831,807 B2 | 12/2004 | Koso et al. |
| 6,917,498 B2 | 7/2005 | Kuwajima et al. |
| 6,939,667 B2 | 9/2005 | Taima |
| 6,952,330 B1 | 10/2005 | Riddering et al. |
| 6,961,221 B1 | 11/2005 | Niu et al. |
| 7,005,304 B2 | 2/2006 | Nakatani et al. |
| 7,006,333 B1 | 2/2006 | Summers |

(Continued)

*Primary Examiner* — Angel Castro
(74) *Attorney, Agent, or Firm* — Intellectual Property Law Offices of Joel Voelzke, APC

(57) ABSTRACT

A dual stage actuated (DSA) suspension includes two PZT microactuators that are attached at their first ends to a non-gimbaled portion of the suspension such as the portion of the flexure that is rigidly attached to the load beam, and are attached at their second ends to the gimbaled portion of the suspension such as the gimbal tongue through flexible connectors that can be formed integrally with the suspension's flexure. The flexible connectors are flexible enough so as not to interfere with the suspension's gimballing action. The flexible connectors transmit force from the PZTs to the gimbal as the PZTs expand and contract in order to rotate the gimbal and thus effect fine movements of the head slider.

20 Claims, 7 Drawing Sheets

Top Plan View

Bottom Plan View

(56) References Cited

U.S. PATENT DOCUMENTS

| | | |
|---|---|---|
| 7,006,335 B2 | 2/2006 | Kuwajima et al. |
| 7,027,267 B2 | 4/2006 | Kuwajima et al. |
| 7,046,485 B2 | 5/2006 | Kuwajima et al. |
| 7,046,486 B1 | 5/2006 | Koffey |
| 7,050,266 B2 | 5/2006 | Ichikawa et al. |
| 7,050,271 B2 | 5/2006 | Miyano et al. |
| 7,072,149 B2 | 7/2006 | Kuwajima et al. |
| 7,072,150 B2 | 7/2006 | Kuwajima et al. |
| 7,106,557 B2 | 9/2006 | Kuwajima et al. |
| 7,161,765 B2 | 1/2007 | Ichikawa et al. |
| 7,230,800 B2 | 6/2007 | Hirano et al. |
| 7,298,593 B2 | 11/2007 | Yao et al. |
| 7,312,955 B2 | 12/2007 | Kuwajima et al. |
| 7,365,930 B2 | 4/2008 | Ishii et al. |
| 7,375,930 B2 | 5/2008 | Yang et al. |
| 7,382,583 B2 | 6/2008 | Hirano et al. |
| 7,403,357 B1 | 7/2008 | Williams |
| 7,551,405 B2 | 6/2009 | Yao et al. |
| 7,609,487 B2 | 10/2009 | Yao et al. |
| 7,684,158 B1 | 3/2010 | Lauer |
| 7,706,105 B2 | 4/2010 | Maslov et al. |
| 7,839,604 B1 | 11/2010 | Coffey et al. |
| 7,843,666 B2 | 11/2010 | Yao et al. |
| 7,881,017 B2 | 2/2011 | Bhatia et al. |
| 8,085,508 B2 | 12/2011 | Hatch |
| 8,089,732 B2 | 1/2012 | Yao et al. |
| 8,094,416 B2 | 1/2012 | Hanya et al. |
| 8,098,461 B2 | 1/2012 | Nojima et al. |
| 8,130,469 B2 | 3/2012 | Yao |
| 8,134,809 B2 | 3/2012 | Yao et al. |
| 8,446,694 B1 | 5/2013 | Tian et al. |
| 8,593,764 B1 * | 11/2013 | Tian et al. .................. 360/245.4 |
| 8,879,210 B1 * | 11/2014 | Hahn et al. ................. 360/245.3 |
| 8,947,831 B1 * | 2/2015 | Ee et al. ..................... 360/245.3 |
| 8,982,513 B1 * | 3/2015 | Tian et al. .................. 360/294.4 |
| 8,995,094 B1 * | 3/2015 | Chen et al. ................. 360/294.4 |
| 9,001,471 B2 * | 4/2015 | Miller et al. ............... 360/294.4 |
| 2006/0077594 A1 * | 4/2006 | White et al. ............... 360/294.4 |
| 2011/0096438 A1 * | 4/2011 | Takada et al. .............. 360/244.2 |
| 2014/0104722 A1 | 4/2014 | Wright et al. |
| 2014/0139953 A1 * | 5/2014 | Hatch ........................ 360/234.5 |
| 2014/0168813 A1 | 6/2014 | Tao et al. |
| 2014/0168815 A1 | 6/2014 | Kudo |

* cited by examiner

Top Plan View

FIG. 5

Bottom Plan View

FIG. 6

Bottom Plan View

DSA SUSPENSION WITH MICROACTUATORS EXTENDING TO GIMBAL THROUGH FLEXIBLE CONNECTORS

CROSS-REFERENCE TO RELATED APPLICATIONS

This application is a continuation of U.S. patent application Ser. No. 13/684,016 filed Nov. 21, 2012, which claims benefit of U.S. Provisional Patent Application No. 61/535,349 filed Nov. 30, 2011, all of which are hereby incorporation by reference as if set forth fully herein.

BACKGROUND OF THE INVENTION

1. Field of the Invention

This invention relates to the field of dual stage actuator (DSA) type suspensions for disk drives including hard disk drives. More particularly, this invention relates to the field of a dual stage actuator suspension in which the microactuators are connected to the gimbaled region through flexible connectors.

2. Description of Related Art

Figure 1:
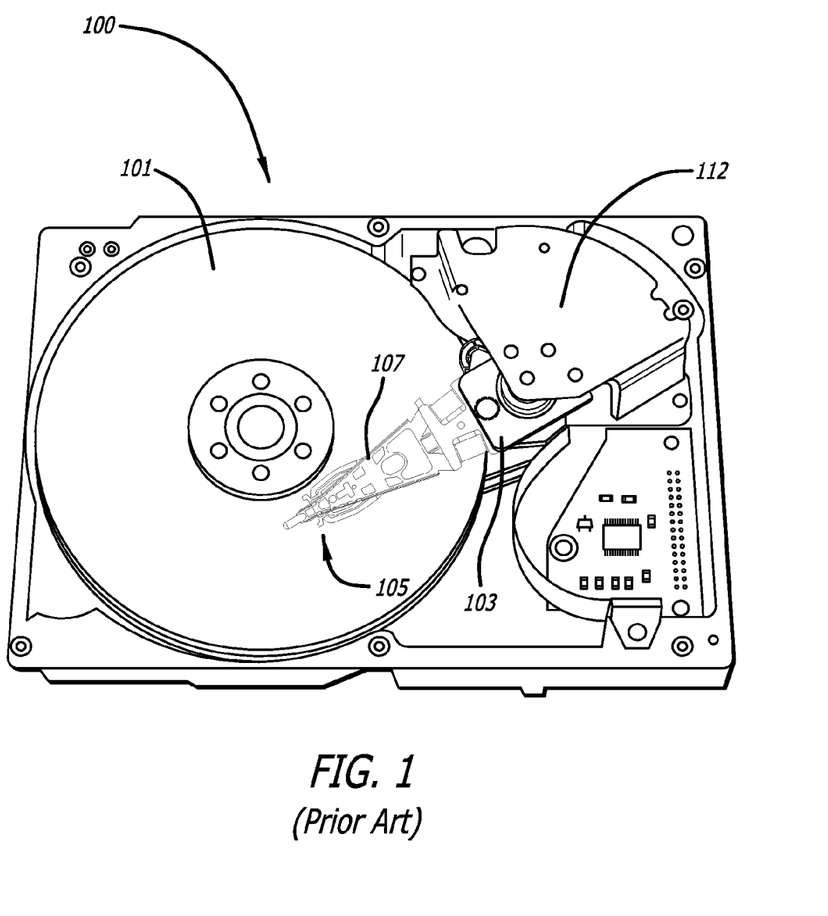
FIG. 1 is an oblique view of a prior art hard disk drive assembly with a DSA suspension.

Magnetic hard disk drives and other types of spinning media drives such as optical disk drives are well known. FIG. 1 is an oblique view of an exemplary prior art hard disk drive and suspension for which the present invention is applicable. The prior art disk drive unit 100 includes a spinning magnetic disk 101 containing a pattern of magnetic ones and zeroes on it that constitutes the data stored on the disk drive. The magnetic disk is driven by a drive motor (not shown). Disk drive unit 100 further includes a disk drive suspension 105 to which a magnetic head slider (not shown) is mounted proximate a distal end of load beam 107. The "proximal" end of a suspension or load beam is the end that is supported, i.e., the end nearest to base plate 12 which is swaged or otherwise mounted to an actuator arm. The "distal" end of a suspension or load beam is the end that is opposite the proximal end, i.e., the "distal" end is the cantilevered end.

Suspension 105 is coupled to an actuator arm 103, which in turn is coupled to a voice coil motor 112 that moves the suspension 105 in an arc in order to position the head slider over the correct data track on data disk 101. The head slider is carried on a gimbal which allows the slider to pitch and roll so that it follows the proper data track on the disk, allowing for such variations as vibrations of the disk, inertial events such as bumping, and irregularities in the disk's surface.

Both single stage actuated disk drive suspensions and dual stage actuated (DSA) suspension are known. In a single stage actuated suspension, only voice coil motor 112 moves suspension 105.

In a DSA suspension, as for example in U.S. Pat. No. 7,459,835 issued to Mei et al. as well as many others, in addition to voice coil motor 112 which moves the entire suspension, at least one microactuator is located on the suspension in order to effect fine movements of the magnetic head slider and to keep it properly aligned over the desired data track on the spinning disk. The microactuator(s) provide much finer control and increased bandwidth of the servo control loop than does the voice coil motor alone, which only effects relatively coarse movements of the suspension and hence the magnetic head slider. Various locations have been proposed for the microactuator(s). The PZTs can be located within baseplate 105, on the load beam 107, or at or near the head gimbal assembly which is located at the distal end of load beam 107. Mei FIGS. 1 and 10 show embodiments in which the microactuators extend from the mount plate, and in which the microactuators are mounted in the middle of the load beam, respectively. Patent publication no. US2001/0096438 by Takada et al. and US2009/0244786 by Hatch show DSA suspensions in which the microactuator are located on the gimbal. U.S. Pat. No. 6,760,196 to Niu et al. shows a collocated microactuator, i.e., a microactuator that lies directly underneath the head slider. U.S. Pat. No. 6,376,964 to Young at al. shows microactuators that bend from side to side and that extend from the distal end of the suspension to the gimbal to effect fine movements of the slider through a hinged linkage structure.

Figure 2:
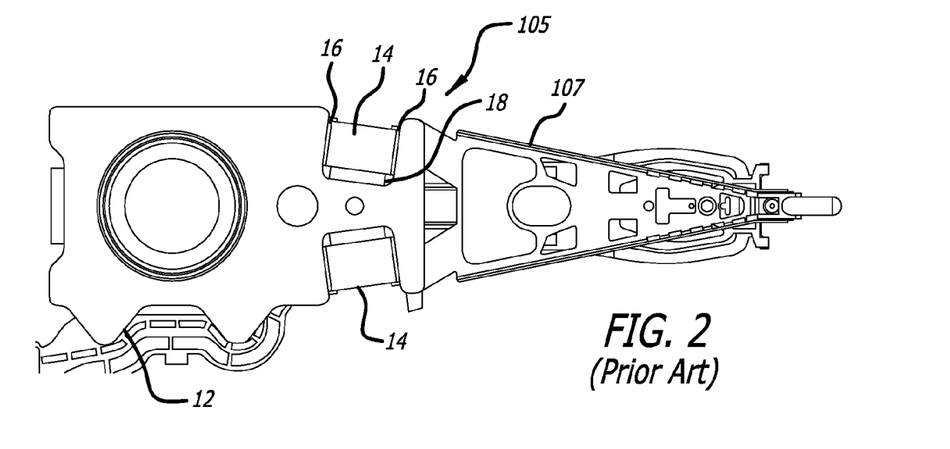
FIG. 2 is a top plan view of the prior art suspension 105 of FIG. 1.

FIG. 2 is a top plan view of the prior art DSA suspension 105 of FIG. 1. Microactuators 14, which are usually but not necessarily piezoelectric (PZT) devices, are mounted on microactuator mounting shelves 16 that are formed in mount plate 12. Microactuators 14 span gap 18.

DSA suspensions having the microactuators on the mount plate such as in FIG. 2 generally have high stroke length per unit of input voltage. This will be referred to simply as having high stroke length for shorthand. Such suspensions, however, usually suffer from low servo bandwidth due to resonances in the part of the suspension that is distal to the PZTs. Slider based (collocated) DSA suspension designs variously have the disadvantages of: requiring additional piece parts; requiring complicated tracing routing, electrical connections, and slider bonding; having heavy slider/tongue assemblies which is undesirable because the extra mass can affect dynamic performance especially under shock conditions; and requiring one or more dedicated tongue features that are prone to manufacturing tolerance issues. Other gimbal-based designs require thin-film PZTs for high stroke lengths, and/or can be difficult to adjust for pitch and roll static attitude.

In the discussion which follows, the microactuator(s) will be referred to as two PZTs for shorthand, although it will be understood that the invention applies equally to suspensions having only a single microactuator and/or microactuator(s) that are not necessarily PZT devices.

SUMMARY OF THE INVENTION

The present invention is of a DSA suspension have one or more PZTs that extend from the load beam, or more generally from a non-gimbaled portion of the suspension, and more specifically from a non-gimbaled or rigid portion of the flexure, to a gimbaled part of the suspension such as the slider tongue. The PZTs are connected to the gimbaled portion through thin ribbons of stainless steel and/or other materials that act as flexible connectors to transmit tensile and compressive forces, and thereby transmit push/pull movement of the PZTs, to the gimbaled portion to which the head slider is attached, the connectors being flexible enough to allow the gimbal to pitch and roll relatively freely and thus not interfere with the normal gimbal action as the head slider pitches and rolls in response to surface irregularities in the surface of the data disk, which is necessary for proper gimbal and suspension operation. The invention provides a DSA suspension with good stroke length per unit of input voltage to the PZTs, high servo bandwidth, and good shock susceptibility. The PZTs can be relatively inexpensive single-layer bulk PZTs as compared to more costly PZT configurations such as thin-film or multilayer PZTs which are called for in some prior designs.

In one aspect therefore, the invention is of a dual stage actuator (DSA) type suspension for a disk drive, the suspension including a load beam and a flexure, the flexure having a rigid part that is secured to the load beam and a gimbaled part that is allowed to pitch and roll freely via gimballing action, a pair of linear actuators such as bulk piezoelectric (PZT) devices attached at one end thereof to the rigid part of the flexure or other rigid part of the load beam and being attached at opposite ends to the gimbaled part through ribbon-like flexible connectors. The flexible connectors can be ribbon-like pieces of stainless steel that are formed integral with the flexure, so as to be extensions that extend from the gimbaled portion to the PZTs. When one PZT contracts and the other expands, the PZT that contracts pulls on one flexible connector, while the PZT that expands pushes on the flexible connector. Those tensile and compressive forces, respectively, pull and push the slider tongue in push/pull fashion to cause the gimbal tongue and hence the slider which is mounted thereon to rotate, thus realizing the desired fine movements of the slider over the data disk. The flexible connectors are strong enough in compression so as to not significantly buckle, thus allowing the PZTs to push on the slider tongue through the flexible connectors. At the same time, the ribbon-like connectors are flexible enough so that they do not significantly interfere with the gimballing action, thus allowing the gimbal to pitch and roll freely per the usual gimballing action of a suspension, and allowing the slider tongue to rotate in response to the push/pull action that the flexible connectors exert on the slider tongue.

Additionally, the PZTs are mounted at a slight angle with respect to the central longitudinal axis of the suspension. The gimbal includes outer gimbal struts, and bridge struts extending from and connecting the outer gimbal struts to the flexible connectors. The bridge struts connect to the flexible connectors at a position that substantially eliminates transverse (side-to-side) force on the slider tongue and hence substantially eliminates linear transverse motion of the slider as the slider rotates. This greatly decreases fretting wear on the dimple, which is of concern because fretting of the dimple produces particle shed, which particles can contaminate the disk drive and can even cause catastrophic head crashes.

The invention presents several advantages over various prior art DSA suspensions. In comparison to gimbal mounted PZT designs, because the PZTs of the present invention are attached at one end to a rigid part of the suspension, the design allows for higher stroke length (movement of the slider per voltage of input applied to the PZTs). The present design can also accommodate longer PZTs, and hence greater stroke, than certain prior art designs. Additionally, the PZTs are located far away from the slider compared to certain gimbal-mounted prior art designs. This improves shock lift-off performance, i.e., the amount of shock as measured in g-forces that the suspension can sustain in operation before the head slider lifts off the disk platter or crashes into the disk platter. Additionally, because of their stroke efficiency, single layer bulk parts can be used in the design instead of multi-layer bulk PZTs or thin film PZTs which are more expensive.

Exemplary embodiments of the invention will be described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION

For discussion purposes, the present disclosure will refer to the microactuator as being "PZTs," although it will be understood that other types of microactuators could be used as well, and thus the invention is applicable to DSA suspensions using other types of micro actuators.

Figure 3:
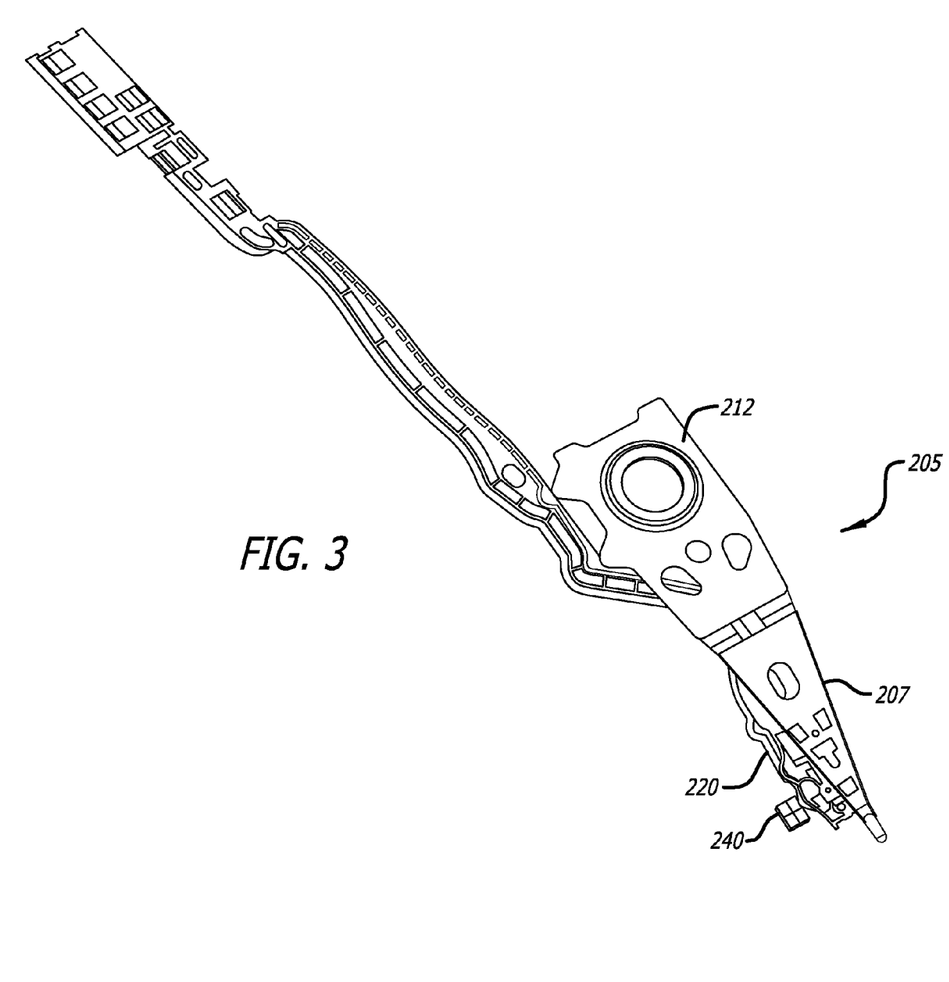
FIG. 3 is an oblique, partially exploded view of a DSA suspension according to an illustrative embodiment of the invention.

FIG. 3 is an oblique, partially exploded view of a DSA suspension according to an illustrative embodiment of the invention. Suspension 205 includes base plate 212, load beam 207, a flexure 220 welded or otherwise affixed to the load beam, and magnetic read/write head slider 240 affixed to the distal and gimbaled portion of flexure 220. For purposes of the present discussion, load beam 207 and the portion of flexure 220 rigidly affixed to load beam 207 will be referred to as being rigid or non-gimbaled.

Figure 4:
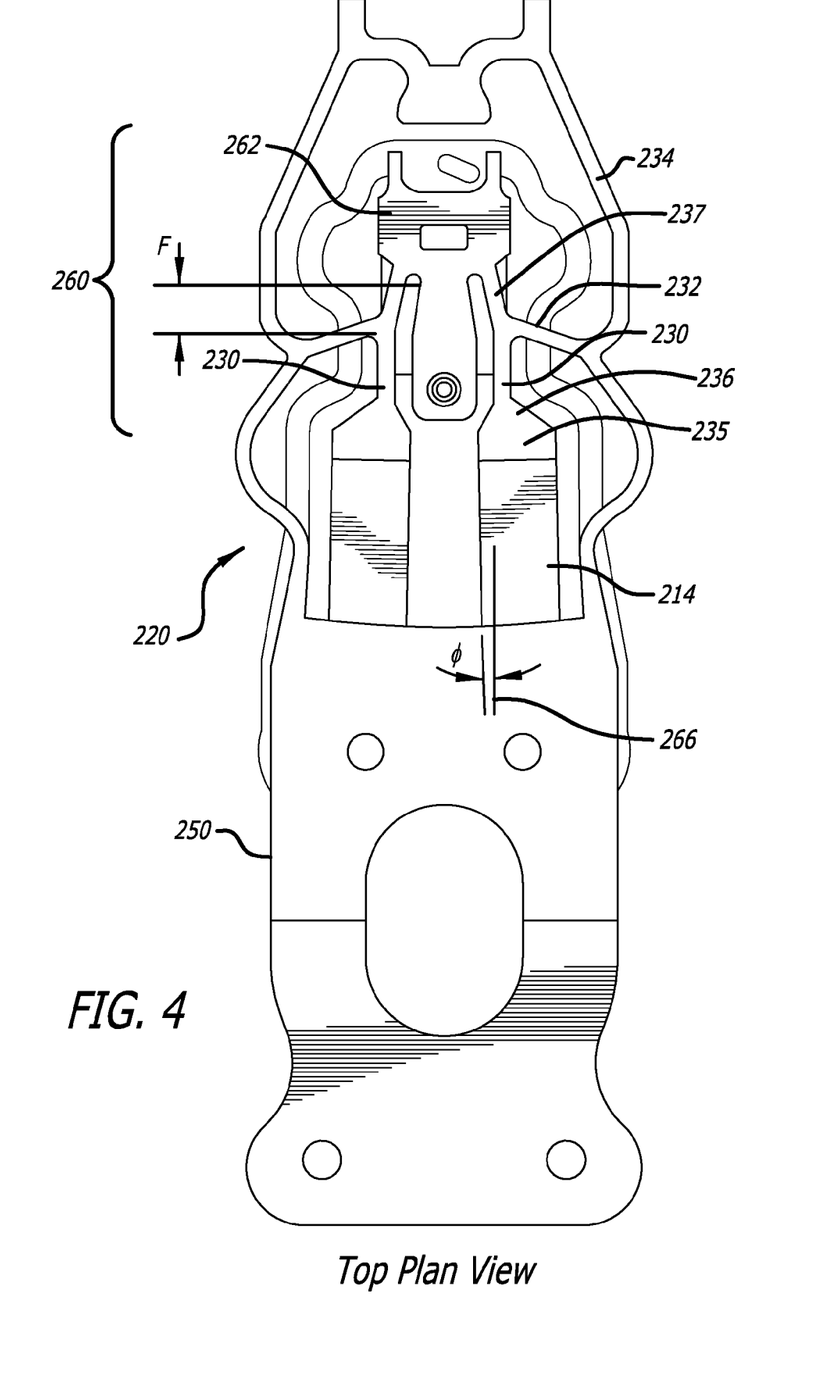
FIG. 4 is a top plan view of the flexure 220 of the suspension of FIG. 3, viewed from what is sometimes referred to as the "gimbal top."
Figure 5:
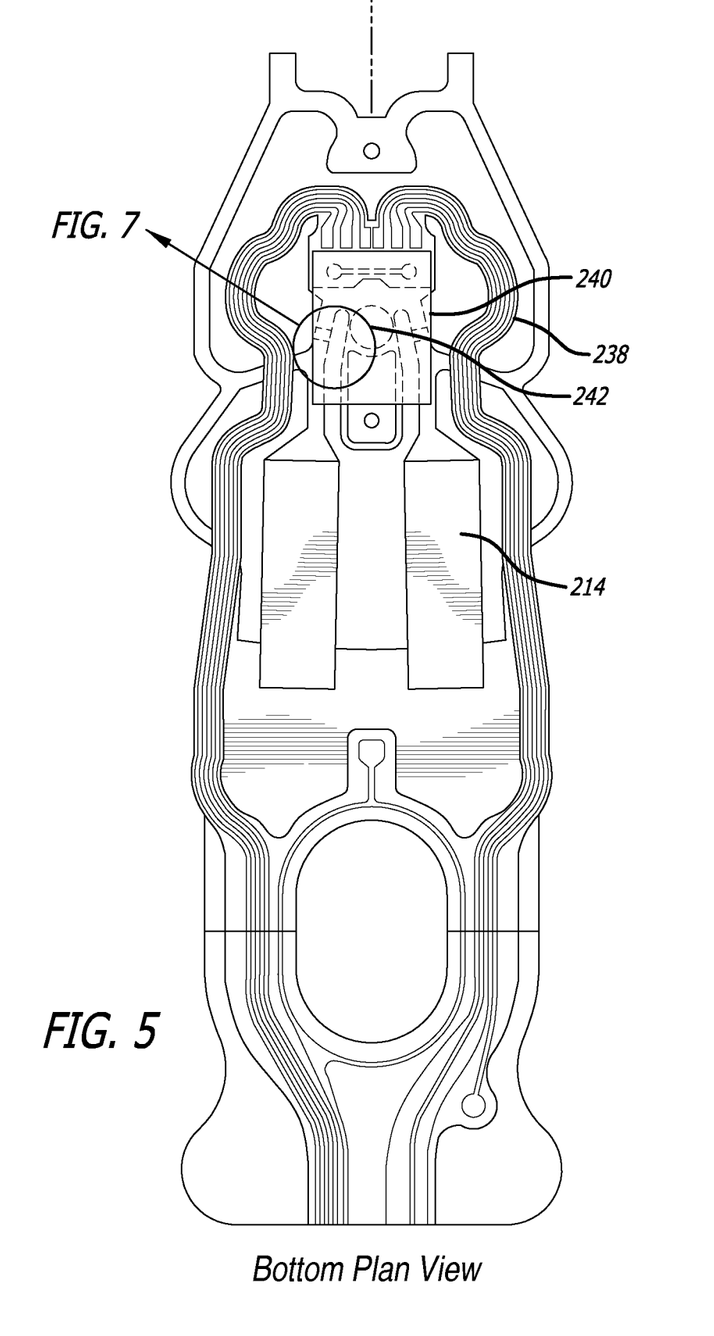
FIG. 5 is a bottom plan view of the flexure 220 of the suspension of FIG. 3, viewed from what is sometimes referred to as the "gimbal bottom."

FIG. 4 is a top plan view of the flexure 220 of the suspension of FIG. 3, viewed from what is sometimes referred to as the "gimbal top," and FIG. 5 is a bottom plan view of the flexure 220 of the suspension of FIG. 3, viewed from what is sometimes referred to as the "gimbal bottom." Flexure 220 typically includes rigid flexure base or non-gimbaled portion 250, a gimbaled portion 260 including slider tongue 262 to which a magnetic read/write head slider 240 is attached, a flexible electrical circuit 238, and a gimbal structure. The gimbal structure allows the gimbaled portion including slider tongue 262 to pitch and roll freely in response to surface irregularities in the data disk as the disk spins underneath slider 240. Slider 240 is supported for rotational movement in 3 degrees (pitch, roll, and yaw) by a dimple in load beam 207, at a location on load beam 207 that corresponds to dimple location 242 shown in FIG. 5. A number of various gimbal designs exist and are commercially used; in the illustrative embodiment shown, the gimbal takes the form of a ring gimbal including outer gimbal struts, or simply outer struts, 234. Bridge struts 232 connect from outer gimbal struts 234 to flexible connectors 230.

Flexible connectors 230 can be integrally formed with the rest of flexure 220. Flexible connectors 230 take the form of ribbon-like sections of the same stainless steel or other material from which flexure 220 is formed. Electrical circuit 238 which is formed as part of flexure 220 on the stainless steel substrate layer, also referred to as the support layer, includes layers of an insulating material such as polyimide, copper alloy signal conductors on top of the polyimide, and an insulating and protective covercoat such as another insulative layer of polyimide over the copper signal conductors. Flexure 220 can be formed using either a subtractive process or an additive process. In an additive process, the layers are built up sequentially over the stainless steel layer into the patterns desired. In a subtractive process, the manufacture begins with a composite laminate of stainless steel/polyimide/copper and the various layers are selectively masked and etched away to form the desired flexure 220. Flexible connectors 230 may comprise only stainless steel over their whole lengths, or at least a majority of their lengths; they have no insulating material such as polyimide or copper for their entire lengths, or at least for a majority of their lengths. Alternatively, flexible connectors 230 may have insulating material such as polyimide on them so as to increase the stiffness of those connectors. The polyimide may be in controlled patterns on flexible connectors 230 so as to increase their stiffness to controlled extents at particular locations.

As seen in the figures, in this embodiment microactuators or PZTs 214 are located entirely proximal of head slider 240. An advantage of this arrangement is that the mass of PZTs is located more proximally than with other designs, and accordingly that mass produces less bending force on the suspension during a shock event and therefore the suspension enjoys an increased liftoff shock resistance than if the PZTs were located closer to the distal end of the suspension, as in the case of some prior art designs. Additionally, because the PZTs are supported at their proximal ends by being mounted to a non-gimbaled portion of the suspension, the mass of the PZTs does not reside on the gimbals during a shock event, and accordingly the mass of the PZTs does not significantly decrease the liftoff force during a shock event.

As further seen in the drawings, in this embodiment flexible connectors 230 include a microactuator attachment pad 235, a transition portion 236 that widens as it approaches attachment pad 235 and PZT 214, and a narrow connector arm 237. Connector arm 237 extends primarily longitudinally from microactuator attachment pad 235 toward gimbaled portion 260. Connector arm 237 is narrower than PZT 214 and attachment pad 235, and is less than half as wide as PZT 214 and attachment pad 235. At its narrowest point, therefore, the overall flexible connector 230 is less than half as wide as PZT 214. Bridge strut 232 which laterally supports flexible connector 230 including connector arm 237 is attached to connector arm 237 at approximately its midpoint, and extends laterally therefrom to provide lateral support to connector arm 237. Connector arm 237 is narrower than microactuator 214 from a location that is more proximal of the proximal-most extent of head slider 240 to a location that is distal of dimple point 242 about which head slider 240 pitches and rolls. As seen most clearly in FIG. 5, each PZT 214 is attached to a respective flexible connector 230 and the stainless steel support layer from which flexible connector is formed, on the same side of stainless steel support layer on which the flexible circuit 238 is located.

Flexible connectors 230 should be strong enough so that when pushed by a first PZT 214 in expansion, they do not buckle significantly. Rather, they transmit a compressive force to gimbaled portion 260. Meanwhile, the second PZT 214 contracts, pulling on its respective flexible connector. The two PZTs therefore operate in push-pull fashion to rotate slider tongue 262. At the same time, flexible connectors 230 should be sufficiently flexible so as to not interfere significantly with the gimballing action of the head slider 240, and allow the non-gimbaled portion 260 to rotate freely when PZTs 214 are actuated.

PZTs 214 or possibly some other type of microactuator are attached at their proximal ends to non-gimbaled flexure base 250, and at their distal ends are attached to flexible connectors 230 such as by either a solder or an epoxy, either non-conductive or conductive depending on whether electrical termination is to the stainless steel body of flexure 220 or to the flexible circuit 238.

Bridge struts 232 connect from outer gimbal struts 234 to flexible connectors 230 at a location that is a distance F distal of dimple center point dimple location 242. Distance F is preferably at least 0.05 mm, and preferably 0.05-0.25 mm. Other preferred dimensions are listed in provisional patent application No. 61/535,349 from which priority is claimed, and which is incorporated herein by reference. Additionally, PZTs 214 are mounted at a slight angle φ with respect to a central longitudinal axis 266 of the suspension, with the distal end of microactuators 214 being closer to central longitudinal axis 266 than the proximal ends of the microactuators. Preferably φ is at least 1 degree, and more preferably 2-12 degrees, and more preferably still about 2-4 degrees. The PZT line of action distance to dimple location can also influence both the stroke sensitivity and the dimple y-force.

The inventors discovered via analysis and extensive finite element analysis modeling that when the suspension is constructed according to the preferred dimensions, slider 240 experiences very little transverse (side-to-side) linear force and hence very little transverse movement when PZTs are actuated. Depending on the exact dimensions used for the flexure including the gimbal, the longitudinal distance F from the bridge strut connection point to the dimple location 242 can be adjusted to obtain negligible transverse linear force and movement of slider 240. The inventors were able to achieve a transverse force of <0.01% of the gram load of the suspension (i.e., <0.0002 gram for gram load of 2.0 gmf), and a transverse force of <0.01 gram per volt for each of the two microactuators. Since the design has low dimple y-force tendency, the contact friction force under the gram load (dimple contact force) is strong enough to hold the tongue and dimple together and act as a pivot (static friction condition, without sliding). Therefore, there is no significant transverse movement between dimple and tongue, and thus less fretting wear. By selecting the dimensions and angles properly, the designer can substantially eliminate transverse (side-to-side) force on the slider tongue and hence substantially eliminate linear transverse motion of the slider as the slider rotates. This greatly decreases fretting wear on the dimple.

Electrical connections from flexible circuit 238 to PZTs 214, and grounding of the PZTs through either electrical circuit 238 and/or to the stainless steel body of flexure 220, can be made by conventional methods that are well known, or by straightforward modifications to those methods. Examples of possible electrical connections are described in provisional patent application No. 61/535,349 from which priority is claimed, and which is incorporated herein by reference. Additional illustrative embodiments of the invention are also disclosed therein.

Figure 6:
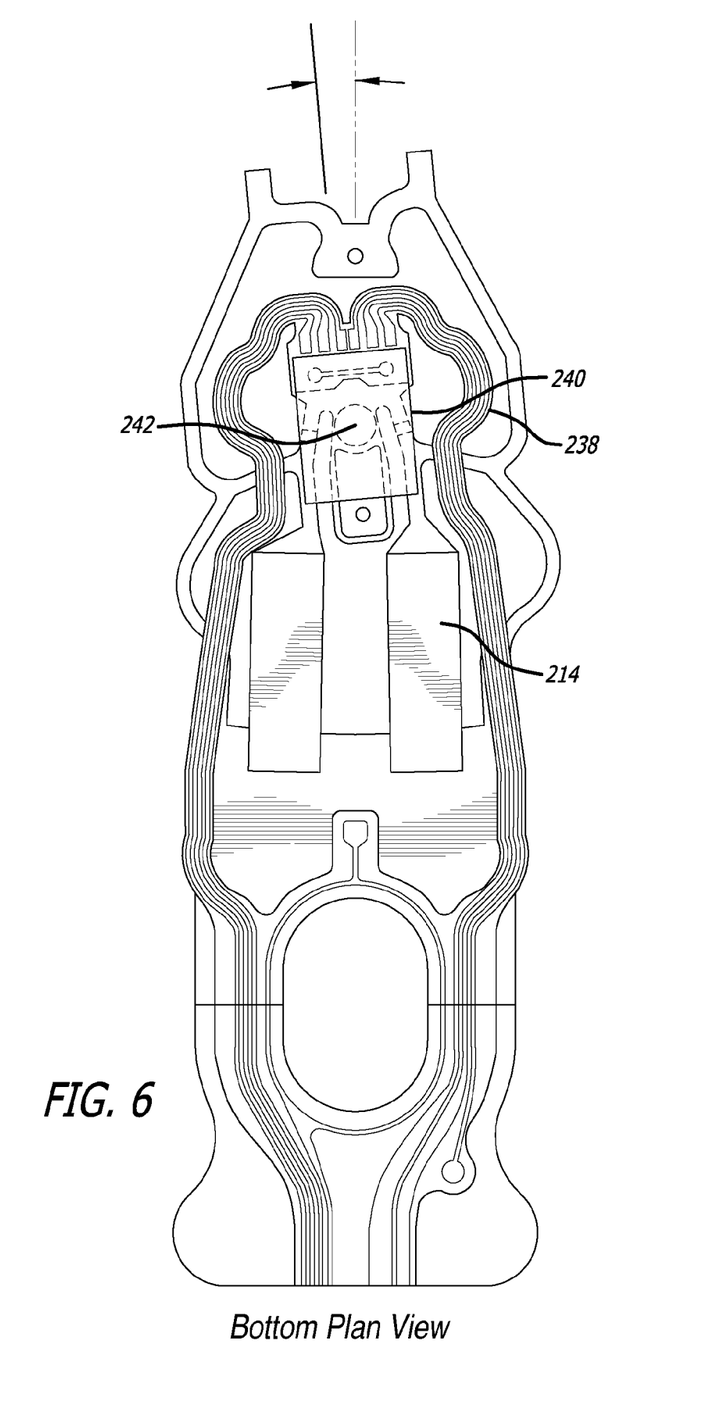
FIG. 6 is a bottom plan view of the flexure of FIG. 5 with the PZTs actuated in order to rotate the slider.

FIG. 6 is a bottom plan view of the flexure of FIG. 5 with the PZTs actuated and the slider 240 rotated by the action of the PZTs. Flexible connectors 230 are slightly bent, thereby allowing for the rotation. Slider 240 is essentially rotated in place about the dimple point with only negligible side-to-side linear movement, and thus experiences almost or essentially pure rotation about the dimple.

Figure 7:
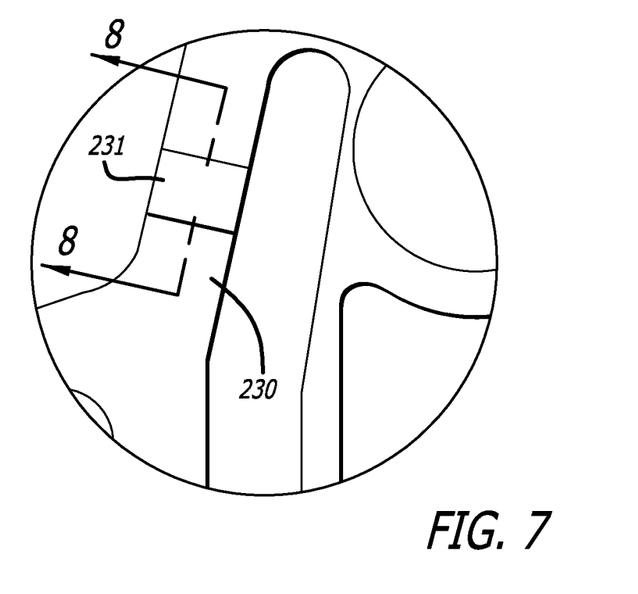
FIG. 7 is a close-up of the area around one of the flexible connectors 230 in FIG. 5.
Figure 8:
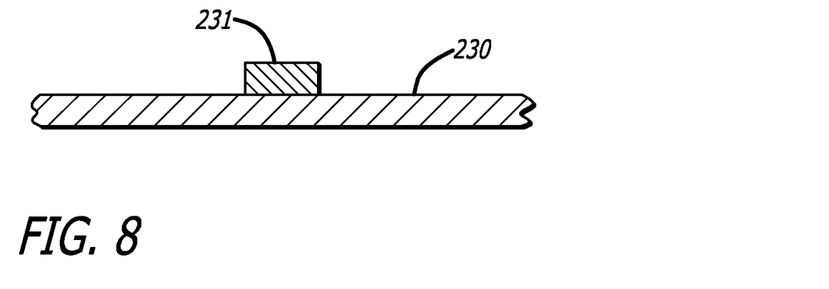
FIG. 8 is a cross section view taken alone section line 8-8' in FIG. 7.

FIG. 7 is a close-up of the area around one of the flexible connectors 230 in FIG. 5, and FIG. 8 is a cross section view taken alone section line 8-8' in FIG. 7, with slider 240 removed for clarity of illustration. Stainless steel flexible connector 230 has a dam 231 thereon. In the preferred embodiment, dam 231 is a dam of insulating material such as polyimide, defined by a raised mass of material. Polyimide dam 231 can be formed at the same time as the rest of the flexure is formed and does not require an additional manufacturing step. Raised dam 231 extends across the entire width, or substantially the entire width, of flexible connector

230. Polyimide dam 231 controls or stops the flow of slider adhesive from the slider area during manufacturing. More specifically, dam 231 helps to prevent the adhesive that is used to bond slider 240 to slider tongue 262 from wicking past dam 231, which could affect the mass, stiffness, and other characteristics of flexible connector 230 and/or bridge strut 232, and hence adversely affect the performance of the suspension.

It will be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. For example, PZT microactuators have been proposed to be placed at locations on a suspension other than the gimbal region, and the invention should therefore not be considered to be limited to a DSA suspension having a co-located microactuator. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A dual stage actuator (DSA) type suspension for a disk drive, the suspension comprising:
    a beam;
    a gimbaled portion including a head slider supported by the beam, the gimbaled portion being supported in gimbaled fashion so that the head slider pitches and rolls freely in response to surface irregularities in a surface of a data disk as the data disk travels underneath the head slider;
    a microactuator having a first end and a second end opposite the first end, the microactuator being attached at its first end to a non-gimbaled portion of the suspension, the microactuator being located entirely proximal of the head slider; and
    a connector having a first end and a second end, the first end of the connector being attached to the second end of the microactuator, and the second end of the connector being attached to the gimbaled portion of the suspension, the connector comprising:
        a microactuator attachment pad to which the microactuator is affixed; and
        a connector arm that extends primarily longitudinally from the microactuator attachment pad toward the gimbaled portion, the connector arm being attached to the gimbaled portion in a manner allowing tensile and compressive forces from contraction and expansion of the microactuator, respectively, to be transmitted to the gimbaled portion thereby effecting rotation of the gimbaled portion;
    wherein the connector arm is narrower than the microactuator and is sufficiently flexible to allow the gimbaled portion to rotate.

2. The DSA suspension of claim 1 further comprising:
    a supporting strut attached to the connector arm and extending laterally outward therefrom.

3. The DSA suspension of claim 2 wherein the supporting strut is attached to the connector arm at approximately a midpoint thereof.

4. The DSA suspension of claim 1 wherein the connector arm has a width that is less than half a width of the microactuator.

5. The DSA suspension of claim 1 wherein the connector arm comprises stainless steel and is formed integrally with the gimbaled portion.

6. The DSA suspension of claim 1 wherein the connector arm is stainless steel and has insulating material on some but less than all of the connector arm.

7. The DSA suspension of claim 6 wherein the insulating material defines a dam that blocks a proximalward flow of adhesive used to bond the head slider to the gimbaled portion.

8. The DSA suspension of claim 6 wherein the insulating material on the connector arm is selected in order to achieve a desired stiffness of the connector arm.

9. The DSA suspension of claim 1 wherein the connector arm is narrower than a width of the microactuator from at least a location that is proximal of the proximal-most extent of the head slider to a location that distal of a dimple point about which the head slider pitches and rolls.

10. A dual stage actuator (DSA) type suspension for a disk drive, the suspension comprising:
    a beam;
    a flexure supported by the beam, the flexure comprising a metal support layer and circuitry thereon, the flexure including a gimbaled portion having a head slider mounted thereto, the gimbaled portion being supported in gimbaled fashion so that the head slider pitches and rolls as a data disk moves underneath the head slider;
    first and second microactuators, each microactuator having a proximal end and a distal end, each microactuator being attached at its proximal end to a non-gimbaled portion of the suspension that is disposed proximal of the head slider; and
    first and second flexible connectors formed from the metal support layer, each flexible connector having a proximal end attached to a respective one of the microactuators and a distal end extending to the gimbaled portion and integral therewith;
    wherein the flexible connectors are sufficiently flexible to allow the gimbaled portion to rotate as a first one of the microactuators extends and a second one of the microactuators contracts.

11. The DSA suspension of claim 10 wherein each of the flexible connectors is laterally supported by a respective strut that extends outwardly therefrom.

12. The DSA suspension of claim 10 wherein each flexible connector is narrower than the respective microactuator to which it is attached.

13. The DSA suspension of claim 10 wherein the flexible circuit of the flexure comprises an insulating material and a signal conductor, and the flexible connectors each have thereon some of said insulating material.

14. The DSA suspension of claim 10 wherein each point at which one of the flexible connectors is attached to a respective one of the microactuators, is located proximal of the head slider.

15. The DSA suspension of claim 14 wherein each of the flexible connectors is longer than the head slider.

16. The DSA suspension of claim 15 wherein each of the flexible connectors attaches to the gimbaled portion at a location that is distal of a dimple point that supports the head slider.

17. The DSA suspension of claim 10 wherein when a first one of the microactuators extends and a second one of the microactuators contracts, the head slider rotates about a dimple point about which the head slider pitches and rolls.

18. The DSA suspension of claim 10 wherein each of the connectors has a transition portion that widens as it approaches the microactuator to which it is respectively connected.

19. The DSA suspension of claim 10 wherein each of the connectors at a narrowest point thereof is less than half as wide as the microactuator to which it is respectively connected.

20. The DSA suspension of claim 10 wherein the proximal end of each microactuator is attached to the metal support layer of the flexure on a same side of the metal support layer on which the flexible circuit is located.

* * * * *

UNITED STATES PATENT AND TRADEMARK OFFICE
CERTIFICATE OF CORRECTION

| | | |
|---|---|---|
| PATENT NO. | : 9,129,624 B1 | Page 1 of 1 |
| APPLICATION NO. | : 14/491932 | |
| DATED | : September 8, 2015 | |
| INVENTOR(S) | : Peter Hahn et al. | |

It is certified that error appears in the above-identified patent and that said Letters Patent is hereby corrected as shown below:

IN THE CLAIMS

In claim 9, column 8, line 40, after "that" insert -- is --.

In claim 10, column 8, line 46, delete "circuitry" and insert -- a flexible circuit --.

Signed and Sealed this
Second Day of February, 2016

Michelle K. Lee
*Director of the United States Patent and Trademark Office*